Nov. 22, 1966   M. BORNER ET AL   3,287,579
TUBULAR ELECTROSTRICTIVE RESONATOR-TYPE TRANSDUCER

Filed Dec. 8, 1964

INVENTORS
Manfred Börner
Ewald Dürre
Wolfgang Hirsch
Günter Semmler
Hans Schüssler BY Spencer & Kaye
ATTORNEYS

3,287,579
TUBULAR ELECTROSTRICTIVE RESONATOR-TYPE TRANSDUCER
Manfred Börner and Ewald Dürre, Ulm, Wolfgang Hirsch, Neu-Ulm, Günter Semmler, Ulm, and Hans Schüssler, Beimerstetten, Germany, assignors to Telefunken Patentverwertungsgesellschaft m.b.H., Ulm (Danube), Germany
Filed Dec. 8, 1964, Ser. No. 416,840
Claims priority, application Germany, Dec. 11, 1963, T 25,270
7 Claims. (Cl. 310—8.2)

The present invention relates to an arrangement for contacting the inner electrode of tubular, i.e., hollow cylindrical, ceramic electrostrictive, especially piezoelectric resonator-type transducers.

One way of contacting the inner electrode of a tubular electrostrictive transducer is by inserting an undulated wire made of resilient material into a bore which is provided with a conductive layer such that the wire comes into resilient physical contact with the coating at at least three places. This type of contacting has various drawbacks, one of them being that the transducer is both detuned and damped inasmuch as, due to engineering reasons, the additional mass which is added to the transducer cannot be kept sufficiently small in comparison with the vibratory mass of the transducer. The detuning is of particular significance when the manufacturing techniques used to make the transducer involve an automatic frequency calibrating step, inasmuch as the already calibrated transducer has to be recalibrated after the contacting.

It is, therefore, the primary object of the present invention to provide a way of contacting a tubular electrostrictive transducer which overcomes the above drawback, i.e., to provide a way in which the subsequent recalibration of the transducer is eliminated, because only then does it become practical and realistic to include, as one of the manufacturing steps, an automatic calibration step.

With the above objects in view, the present invention resides mainly in a tubular electrostrictive resonator-type transducer having a bore which is provided with a conductive coating, and lead-in means electrically contacting this coating and mechanically engaging the same exclusively substantially in the vibratory nodal plane of the transducer.

Additional objects and advantages of the present invention will become apparent upon consideration of the following description when taken in conjunction with the accompanying drawings in which:

FIGURE 3 also shows how the lead-in element is secured to the transducer.

Figures 1, 2, 2A:
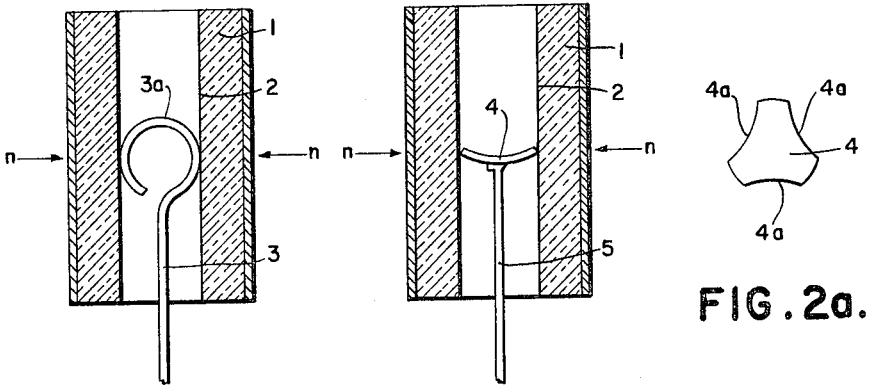
FIGURE 1 is a sectional view of a transducer contacted in accordance with one embodiment of the present invention.
FIGURE 2 is a sectional view of a transducer contacted in accordance with another embodiment of the present invention.
FIGURE 2a is an end view of the lead-in element used in the arrangement of FIGURE 2.

Referring now to the drawing and to FIGURE 1 thereof in particular, the same shows a tubular electrostrictive resonator-type transducer 1 made of ceramic material and having central bore which is provided with an internal silver coating 2. The inner diameter of the transducer, which is a resonator in the form of a small tube, can vary between 0.4 and 0.5 millimeter. The coating 2 of the transducer is contacted by means of a lead-in in the form of a round lead wire 3 which is made of resilient material and has a thickness of, for example, 0.1 millimeter, the end of this wire being bent to form a loop, 3a as shown in FIGURE 1. The loop-shaped configuration, which can easily and accurately be imparted to the wire by a suitable machine, gives the wire sufficient resiliency to enable it to accommodate itself between the 0.4 and 0.5 millimeter of the inside diameter of the transducer. Furthermore, thanks to the fact that the wire is round, the coating will not be scratched. Moreover, the small contact surfaces substantially facilitate the insertion of the wire into the transducer and allows the position of the wire within the transducer 1 to be adjusted quickly and accurately.

In accordance with the present invention, the wire 3 is so positioned that the loop contacts, i.e., mechanically engages, the transducer 1 exclusively in the vibratory nodal plane, the same being the central plane represented, in FIGURE 1, between the arrows n—n.

As stated above, the inner diameter of the transducer may vary between 0.4 and 0.5 millimeter. This is substantially consistent with a typical transducer element which, in practice, may have an outside diameter of 1.4 millimeters and a length of 5 millimeters, the inside diameter generally being manufactured with a tolerance of about ±10%.

FIGURE 2 shows the same transducer as depicted in FIGURE 1, the lead-in means here being constituted by lead-in wire 5 and a resilient, generally circular metal plate 4, the latter being welded to the upper end of the lead-in wire 5. The plate 4 is elastically arched or dished, thereby to provide the requisite contact pressure. In practice, the plate 4, which can be star-shaped as shown in FIGURE 2a in that it has a number of circumferentially distributed segments 4a cut out of it, will be made of such material and have such thickness as to produce the desired contact pressure.

Due to the relatively large tolerance of the bore which has to be allowed for, the plate 4, after the same has been inserted, will be deformed quite substantially, i.e., the plate will have a relatively marked curvature, as shown in FIGURE 2. In practice, the lead-in means, i.e., the plate 4 together with the already welded-on wire 5, will be introduced into the bore of the transducer by means of a device which temporarily deforms the plate 4, which, in unstressed state, has an outside diameter larger than the inside diameter of the transducer bore, so that the plate will be arched through more markedly prior to and during the insertion process than after the device has released the plate and the latter assumes its final configuration within the bore of the transducer. In this way, the plate 4 will not scrape along the interior surface of the transducer and hence will not damage the already calibrated transducer.

By way of example, the plate 4 may be made of resilient gold-plated sheet metal, such as steel, of a thickness of 0.05 millimeter, while the wire 5 may be a gold-plated steel wire having a diameter of 0.1 millimeter.

Figures 3, 4A, 4B:
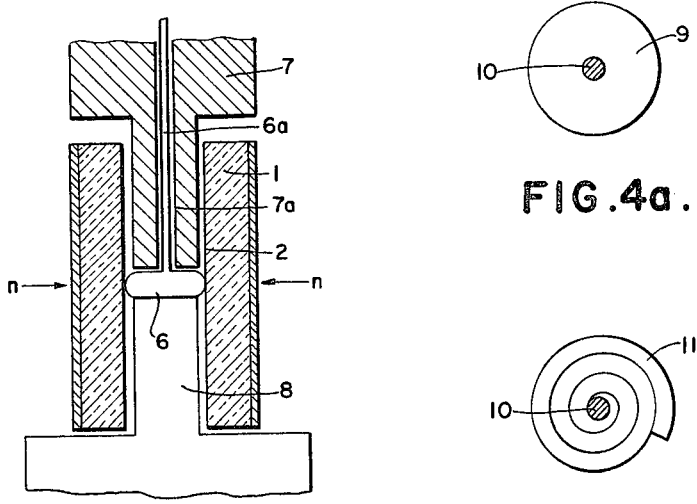
FIGURE 3 is a sectional view of a transducer contacted in accordance with yet another embodiment of the present invention.
FIGURE 4a is an end view, partly in section, of a solder-type lead-in element used in accordance with a still further embodiment of the present invention.
FIGURE 4b is an end view, partly in section, of another solder-type lead-in element in accordance with the present invention.

FIGURE 3 again shows the same transducer as is depicted in FIGURES 1 and 2, the lead-in means here being constituted by pellet 6 which is a ball melted onto a silver wire 6a, in a hydrogen flame. This pellet is susceptible to being deformed under pressure and is pressure welded, i.e., subjected to a deformation which joins the pellet to the coating 2. FIGURE 3 shows the device by means of which the pellet is pressure welded to the transducer as incorporating a plunger 7 which is provided with a central bore 7a, through which extends the lead-in wire, and a cooperating ram 8. Both the plunger 7 and the ram 8 are introduced into the bore of the transducer and are so positioned that the pellet 6 will be in alignment within the central vibratory nodal plane n—n of the transducer 1, whereupon the plunger 7 and ram 8 will be brought together thereby to deform the ball to give it the pellet configuration and to pressure weld the same with the coating 2.

In practice, it is best if the size of the ball and the applied pressure are kept constant, so that the transducer will not be called upon to withstand excessively large forces.

It has been found that the use of the pressure welding technique results in an intimate contact between the coating 2 and the lead-in. This allows the plunger and ram to be withdrawn, and at the same time, the strength of the junction can be tested. When the end of silver lead-in wire is melted off—this being done at a point sufficiently far away from the transducer—a new ball can be formed at the same time.

FIGURES 4a and 4b show respective lead-in means, each incorporating a lead-in wire 10 and a thin, flat solder means made of sheet material. The lead-in means of FIGURE 4a includes a disc-shaped solder mass 9 while the lead-in means of FIGURE 4b includes a spiral band-shaped solder mass 11. In each case, it is the center of the solder mass which is contacted by the lead-in wire 10.

The lead-in means of FIGURES 4a and 4b may be secured to the transducer, in the correct plane, as described above, at an oven temperature which is sufficiently below the Curie point of the ceramic of which the transducer is made but is nonetheless sufficiently above the maximum operating temperature. If the Curie point is about 180° C., the solder will be a material having a melting point of between about 100 to 120° C.; so that the operating temperature can be up to about +60° C.

Due to the rotation-symmetrical configuration of the solder masses in each of the lead-ins of FIGURES 4a and 4b, the wire 10 will be positioned centrally within the transducer and there will be a narrow soldering zone. In practice, the diameter of the solder mass, which may also be considered as constituting a pellet, will be somewhat larger than the inner diameter of the bore of the transducer, and the lead-in will be inserted into the transducer by means of a device such as is depicted in FIGURE 3. The transducer should occupy an upright position in the oven during the soldering.

Thanks to each of the above-described ways of contacting the transducer, the latter after having once been calibrated, automatically during the manufacturing process need not be recalibrated manually after having been contacted by the lead-in.

It will be appreciated that, the closer to the vibratory nodal plane the lead-in means are connected to the transducer, the less will calibration of the transducer be upset. In practice, however, it is not absolutely essential that the contacting be effected absolutely precisely in the vibratory nodal plane, inasmuch as any deviation of up to one-tenth of the length of the transducer will have but insignificant influence insofar as the detuning of the transducer is concerned. Therefore, it will suffice if the lead-in means electrically contact the coating 2 of the transducer and mechanically engage the same at least substantially in the vibratory nodal plane of the transducer, this being the only place at which engagement between the lead-in means and the transducer occurs.

The present invention has been found to be especially suitable in the manufacture of miniature electromechanical filters.

It will be understood that the above description of the present invention is susceptible to various modifications, changes, and adaptations, and the same are intended to be comprehended within the meaning and range of equivalents of the appended claims.

What is claimed is:
1. An arrangement comprising, in combination:
 (a) a tubular electrostrictive resonator-type transducer having a bore which is provided with a conductive coating, said transducer having a vibratory nodal plane; and
 (b) lead-in means electrically contacting said coating and mechanically engaging the same exclusively substantially in said vibratory nodal plane of said transducer, said lead-in means comprising a wire and an element which is connected to said wire and mechanically engages said transducer, said element being a resilient and generally circular arched plate having, in unstressed state, an outside diameter which is larger than the inside diameter of said bore, in consequence of which said plate, when in said bore, will resiliently press against said transducer.

2. An arrangement s defined in claim 1 wherein said plate has a plurality of circumferentially distributed segments cut out of it.

3. An arrangement comprising, in combination:
 (a) a tubular electrostrictive resonator-type transducer having a bore which is provided with a conductive coating, said transducer having a vibratory nodal plane; and
 (b) lead-in means electrically contacting said coating and mechanically engaging the same exclusively substantially in said vibratory nodal plane of said transducer, said lead-in means comprising a wire and an element which is connected to said wire and mechanically engages said transducer, said element being a pellet which is susceptible to being deformed under pressure and which is pressure welded to said transducer.

4. An arrangement as defined in claim 3 wherein said pellet is made of the same material as said wire.

5. An arrangement comprising, in combination:
 (a) a tubular electrostrictive resonator-type transducer made of a ceramic and having a bore which is provided with a conductive coating, said transducer having a vibratory nodal plane; and
 (b) lead-in means electrically contacting said coating and mechanically engaging the same exclusively substantially in said vibratory nodal plane of said transducer, said lead-in means comprising a wire and an element which is connected to said wire and mechanically engages said transducer, said element being a flat mass made of solder having a melting point that is between the Curie point of said ceramic and above the maximum temperature at which the transducer is to operate.

6. An arrangement as defined in claim 5 wherein said flat mass of solder is constituted by a disc.

7. An arrangement as defined in claim 5 wherein said flat mass of solder is constituted by a spiral.

References Cited by the Examiner
UNITED STATES PATENTS
2,573,168  10/1951  Mason et al. _____ 310—8.2 X MILTON O. HIRSHFIELD, *Primary Examiner.*

A. J. ROSSI, *Assistant Examiner.*